United States Patent
Giardello et al.

(10) Patent No.: US 7,285,593 B1
(45) Date of Patent: Oct. 23, 2007

(54) POLYOLEFIN COMPOSITIONS OPTIONALLY HAVING VARIABLE TOUGHNESS AND/OR HARDNESS

(75) Inventors: Michael A. Giardello, Pasadena, CA (US); Jonathan G. Lasch, Pasadena, CA (US); Christopher J. Cruce, Poway, CA (US); Jessie G. Macleod, Pasadena, CA (US)

(73) Assignee: Advanced Polymer Technologies, Inc. LA (US)

( * ) Notice: Subject to any disclaimer, the term of this patent is extended or adjusted under 35 U.S.C. 154(b) by 0 days.

(21) Appl. No.: 09/312,811

(22) Filed: May 17, 1999

Related U.S. Application Data

(60) Provisional application No. 60/118,865, filed on Feb. 5, 1999, provisional application No. 60/085,981, filed on May 19, 1998.

(51) Int. Cl.
C08G 61/04 (2006.01)
A63B 53/10 (2006.01)

(52) U.S. Cl. ............... 524/731; 524/554; 526/171; 526/283; 473/282; 473/316; 473/349

(58) Field of Classification Search ........... 524/554, 524/731; 525/105, 211, 290; 473/282, 316, 473/349, 567; 526/171, 283
See application file for complete search history.

(56) References Cited

U.S. PATENT DOCUMENTS

| | | | |
|---|---|---|---|
| 4,485,208 A | 11/1984 | Klosiewicz | 524/773 |
| 4,701,510 A * | 10/1987 | Minchak et al. | 526/283 |
| 5,077,414 A | 12/1991 | Arduengo, III | 548/335 |
| 5,171,776 A | 12/1992 | Khasat | 529/518 |
| 5,182,405 A | 1/1993 | Arduengo, III | 548/335.1 |
| 5,312,940 A | 5/1994 | Grubbs et al. | 556/136 |
| 5,342,909 A * | 8/1994 | Grubbs et al. | 526/283 X |
| 5,710,298 A | 1/1998 | Grubbs et al. | 556/22 |
| 5,728,839 A | 3/1998 | Herrmann et al. | 548/103 |
| 5,728,917 A | 3/1998 | Grubbs et al. | 585/653 |
| 5,831,108 A | 11/1998 | Grubbs et al. | 556/21 |
| 5,840,238 A | 11/1998 | Setiabudi et al. | 264/331.17 |
| 5,849,851 A | 12/1998 | Grubbs et al. | 526/93 |
| 5,936,100 A | 8/1999 | Fürstner et al. | 549/266 |
| 5,939,504 A | 8/1999 | Woodson et al. | 526/145 |
| 6,001,909 A | 12/1999 | Setiabudi | 524/265 |
| 6,020,443 A | 2/2000 | Woodson et al. | 526/135 |
| 6,025,496 A | 2/2000 | Herrmann et al. | 548/107 |
| 6,100,323 A | 8/2000 | Setiabudi et al. | 524/430 |

FOREIGN PATENT DOCUMENTS

| | | |
|---|---|---|
| WO | WO97/20865 | 6/1997 |
| WO | WO97/29865 | 6/1997 |
| WO | WO97/29135 | 8/1997 |
| WO | WO99/51344 | 10/1999 |
| WO | WO 00/15339 | 3/2000 |
| WO | WO 00/58322 | 10/2000 |

OTHER PUBLICATIONS

English language translation of JP 02-289947, published Jun. 4, 1992.*
Furstner, et al., "Cationic ruthenium allenylidene complexes as a new class of performing catalysts for ring closing metathesis," Chem. Commun., 1998, pp. 1315-1316.
Herrmann et al. "Nickel(II) Complexes of N-Heterocyclic Carbenes," Organometallics, 16, 2209-2212 (1997).
Herrmann et al. "N-Heterocyclic Carbenes," Angew Chem. Int. Ed. Engl., 36, 2162-2187 (1997).
Glander, et al. "Development and Application of Highly Efficient Ruthenium-Based Catalysts for the Ring Opening Metathesis Polymerization," Macromol. Symp. 127, 67-75 (1998).
Nolan, Steve P. "Synthetic, Thermochemical and Catalytic Studies of Ruthenium and Rhodium Complexes," Jun. 26, 1998.
Herrmann et al. "A Novel Class of Ruthenium Catalysts for Olefin Metathesis" Abstract: 11th International Symposium on Homogenous Catalysis, University of St. Andrews, Scotland U.K. Jul. 1998.
Herrmann, et al. "A Novel Class of Ruthenium Catalysts for Olefin Metathesis," Angewandte Chemie International Edition, 37, 18, 2490-2493 (Oct. 2, 1998).
Ackermann, et al. "Ruthenium Carbene Complexes with Imidazolin-2-ylidene Ligands Allow the Formation of Tetrasubstituted Cycloalkenes by RCM," Tetrahedron Letters, 40, 4787-4790 (1999).
Huang, et al. "Influence of Sterically Demanding Carbene Ligation on Catalytic Behavior and Thermal Stability of Ruthenium Olefin Metathesis Catalysts," Organometallics, 18, 5375-5380 (1999).

* cited by examiner

Primary Examiner—Fred Teskin
(74) Attorney, Agent, or Firm—David H. Jaffer; Pillsbury Winthrop Shaw Pittman LLP

(57) ABSTRACT

The present invention provides novel polyolefin compositions having variable hardness and/or toughness properties. The polyolefin compositions include: a polyolefin prepared by the metathesis of an olefin monomer using a ruthenium or osmium carbene catalyst; and one or more hardness and/or toughness modulators. The polyolefin is preferably poly(dicyclopentadiene), or poly-DCPD. Also provided are articles of manufacture, such as molded parts, produced from the polyolefin compositions. The disclosed compositions are useful in marine, recreational and sports products.

26 Claims, No Drawings

POLYOLEFIN COMPOSITIONS OPTIONALLY HAVING VARIABLE TOUGHNESS AND/OR HARDNESS

This application claims the benefit of co-pending U.S. Provisional Patent Application Ser. Nos. 60/085,981, filed May 19, 1998; and 60/118,865, filed Feb. 5, 1999.

FIELD OF THE INVENTION

The present invention is directed generally to novel polyolefin compositions having variable toughness and/or hardness properties, and to articles of manufacture produced therefrom. More specifically, the present invention relates to dicyclopentadiene-based polymers (poly-DCPD) comprising various toughness and/or hardness modulators.

BACKGROUND OF THE INVENTION

During the past twenty-five years, research efforts have enabled the elucidation of olefin metathesis reactions catalyzed by transition metal complexes. In particular, certain ruthenium and osmium carbene compounds have been identified as effective catalysts for olefin metathesis reactions such as, for example, ring opening metathesis polymerization (ROMP). Such metathesis catalysts have been previously described in, for example, U.S. Pat. Nos. 5,312,940; 5,342,909; 5,728,917; 5,710,298; and 5,831,108; PCT Publications WO 97/20865 and WO 97/29135; and in U.S. Provisional Patent Application No. 60/115,358, filed Jan. 8, 1999 by inventors Steven P. Nolan and Jinkun Huang entitled "Novel Metathesis Catalyst Compositions and Methods for Their Use," the disclosures of which are incorporated herein by reference.

Examples of olefin monomers that may be polymerized using the aforementioned metathesis catalysts include dicyclopentadiene (DCPD), in addition to other strained cyclic olefin compounds. Polymer compositions, and articles or parts produced therefrom, are useful in a wide variety of applications because of their unique physical properties and ease of fabrication. In particular, poly-DCPD compositions show promise for applications requiring a combination of toughness, hardness, elasticity, rebounding qualities, marine anti-fouling and/or corrosion resistance, among other properties. In addition, the low viscosity of DCPD-based compositions makes these resins particularly well-suited to the fabrication of complex shapes and composites.

Numerous common polymer additives, including pigments, dyes, plasticizers, rubber particles and antioxidants, among others, have been included in polymer compositions in an effort to vary or preserve over time one or more physical properties of the polymer. However, these additives may also effect unintended or undesirable changes in one or more physical properties. Thus, it has not been possible using traditional high-viscosity thermoset resins to vary the hardness, toughness or surface "feel" of the resin compositions, or parts thereof, through the addition of these additives without compromising one or more desirable properties of the native polymer. In addition, the surface "feel" or texture, as well as the elasticity, toughness and hardness of a polymer composition, or parts made thereof, may be important considerations in certain commercial applications.

In light of the foregoing, there exists a need for polymer compositions, and articles of manufacture thereof, which may be formulated to have variable toughness and/or hardness for use in a wide range of commercial applications. This is especially so for materials related to the sports, recreational and marine industries. Preferably, the compositions' properties are not compromised by the incorporation of additives giving rise to the beneficial toughness and/or hardness characteristics.

SUMMARY OF THE INVENTION

The present invention relates to novel polyolefin compositions having variable toughness and/or hardness properties, to methods of making the compositions, and to articles of manufacture produced therefrom. In particular, the present invention provides for toughness/hardness modulating additives, which may be added to polyolefin resins. These toughness/hardness modulators permit controllable modulation of the surface "feel", toughness and/or hardness of a polyolefin article or part. Such modified polyolefin compositions are useful in a variety of applications and products, particularly those in the sports, recreational, and marine fields.

In certain preferred embodiments, the polyolefin compositions of the present invention are prepared by the ring-opening metathesis polymerization (ROMP) of dicyclopentadiene (DCPD) and related strained cyclic olefins, polymerized with a metal catalyst system. Ruthenium and osmium carbene compounds have been identified as effective catalysts for olefin metathesis reactions such as, for example, ROMP. Such metathesis catalysts are now well known in the art.

In preferred embodiments, the present invention involves ROMP reactions where DCPD resin compositions are cast into product molds or infused into a fiber preform. For certain applications, pigments, dyes, antiozonants and/or antioxidants, among other additives, may optionally be included.

The present invention provides, in certain preferred embodiments, polyolefin compositions containing toughness and/or hardness modulators. These polymer compositions produce articles or parts that are, for example, as tough and impact resistant as the best thermoplastics, but have the ease of fabrication of thermosets. In addition, the resin system of the present invention is tolerant to additives, fillers and fibers, such as glass, carbon, fiberglass and Kevlar, among others. As such, the modulating additives are dispersed in the polyolefin resin matrix to controllably alter various physical properties of the native polyolefin.

One aspect of the present invention is a novel composition comprising a polyolefin, prepared by the metathesis of an olefin monomer using a ruthenium or osmium carbene catalyst, and one or more toughness and/or hardness modulators. These compositions possess variable hardness, toughness and/or surface "feel" properties. Preferably, the polyolefin is poly-DCPD.

Another aspect of the present invention is an article of manufacture, such as a molded part, comprising a polyolefin, prepared by the metathesis of an olefin monomer using a ruthenium or osmium carbene catalyst, and one or more toughness and/or hardness modulators.

These and other aspects of the present invention will be apparent to one skilled in the art in light of the following detailed description of the preferred embodiments.

DETAILED DESCRIPTION OF THE PREFERRED EMBODIMENTS

The present invention is directed to polyolefin compositions having variable toughness and/or hardness properties, and to articles of manufacture made therefrom. In certain embodiments, the present invention provides toughness/ hardness modulating additives, which may be added to polyolefin resins to alter various physical properties. More specifically, addition of toughness and/or hardness modulators allows controllable modulation of the surface "feel", hardness and/or toughness of a polyolefin article. In particular cases, a modulator may serve as both a toughness and as a hardness modulator. The polyolefin compositions of the present invention are useful in a wide variety of applications, particularly for use in sports, recreational and marine equipment products.

The polyolefin compositions of the present invention may be prepared by the metathesis of olefin monomers (e.g., DCPD) and related strained cyclic olefins, polymerized with a metal catalyst system. Ruthenium and osmium carbene compounds have been identified as effective catalysts for olefin metathesis reactions such as, for example, ring opening metathesis polymerization (ROMP). Such metathesis catalysts are known in the art and have been previously described in, for example, U.S. Pat. Nos. 5,312,940; 5,342,909; 5,728,917; 5,710,298; and 5,831,108; PCT Publications WO 97/20865 and WO 97/29135; and in U.S. Provisional Patent Application No. 60/115,358, filed Jan. 8, 1999 by inventors Steven P. Nolan and Jinkun Huang entitled "Novel Metathesis Catalyst Compositions and Methods for Their Use," all of which are incorporated herein by reference.

The catalyst:olefin monomer ratio in the present invention is preferably between about 1:100 and about 1:100000. More preferably, the catalyst:monomer ratio is between about 1:1000 and about 1:10000 and, most preferably, is between about 1:3000 and about 1:8000. Particularly preferred metal catalysts include, but are not limited to, bis(tricyclohexylphosphine) benzylidene ruthenium dichloride, bis(tricyclohexylphosphine) dimethylvinylmethylidene ruthenium dichloride and bis(tricyclopentylphosphine) dimethylvinylmethylidene ruthenium dichloride.

Preferred hardness modulators include, for example, rubber-like or elastomeric additives such as polybutadienes, polyisoprenes, and the like. Polybutadienes and polyisoprenes of various sources, and of various number-average molecular weights ($M_n$) or weight-average molecular weights ($M_w$), may be utilized in the present invention as hardness modulators. Unexpectedly, the poly-DCPD resins of the present invention allow compositions containing polybutadiene to be clear or transparent, rather than opaque or translucent. This is a result of the fact that polybutadiene becomes incorporated into the polymer backbone during the metathesis reaction, leading to little or no phase separation of the polybutadiene particles. The hardness modulators of the present invention, when added to a polyolefin resin composition, alter the hardness and/or surface "feel" of the composition compared to the unmodified or native polyolefin. In addition to butadiene- and isoprene-based elastomers, other hardness modulators include plasticizers such as dioctyl phthalate and various molecular weight hydrocarbon, fluorocarbon or similar jellies, greases and waxes; carboxylic acids and salts thereof; and co-monomers such as norbornene, cyclooctadiene, cyclooctene, cyclohexenylnorbornene, norbornadiene, di(methylcyclopentadiene), cyclopentene and/or methylcyclopentene.

The amount of hardness modulator included in the polyolefin compositions of the present invention is preferably about 0.1%-60% by weight of the olefin monomer to which it is added. More preferably, the amount of hardness modulator is about 1%-20% by weight of the olefin monomer and, most preferably, is about 2%-10%. In certain cases, hardness modulators may be included in amounts outside the preferred ranges. The determination of the appropriate amount of hardness modulator in a given polyolefin composition can be readily determined by one skilled in the art based on, for example, the degree of microphase separation desired.

Preferred toughness modulators include silicones such as, for example, polysiloxane compositions of various viscosities, molecular weights and functionalities. Particularly preferred toughness modulators include poly(dimethylsiloxane) and poly(diphenylsiloxane). Polyolefin compositions comprising such toughness modulators possess significantly increased toughness properties without significant concomitant losses in heat distortion temperature (HDT). In the case of poly-DCPD compositions comprising low molecular weight poly(dimethylsiloxane), marked improvements in thermomechanical properties are observed.

The amount of toughness modulator included in the polyolefin compositions of the present invention is preferably about 0.1%-20% by weight of the olefin monomer to which it is added. More preferably, the amount of toughness modulator is about 0.5%-10% by weight of the olefin monomer and, most preferably, is about 1%-5%. For example, poly-DCPD resins containing 3 parts per hundred low molecular weight (MW) poly(dimethylsiloxane) (Shin Etsu DMF-50) possess notched Izod impact values in excess of 4 ft.-lb./in. and HDT values above 130° C. In certain cases, toughness modulators may be included in amounts outside the preferred ranges. The determination of the appropriate amount of toughness modulator in a given polyolefin composition can be readily determined by one skilled in the art based on, for example, the degree of phase separation desired and the degree of transparency/translucency desired. It is well known in the art that phase separation contributes to the toughness of a polyolefin material. The foregoing preferred ranges have been determined to provide polyolefin articles possessing increased toughness.

For certain applications and products (e.g., weighted golf club heads), polyolefin hybrid compositions further comprising density modulators may be preferred. Hybrid modified poly-DCPD articles can combine, for example, increased density with increased toughness. In these applications, preferred density modulators include metallic density modulators where increased density polyolefin compositions are desired, and microparticulate (e.g., microsphere) density modulators where either increased or decreased density polyolefin compositions are desired.

Examples of metallic density modulators include, but are not limited to, powdered, sintered, shaved, filed, particulated or granulated metals, metal oxides, metal nitrides and/or metal carbides, and the like. Preferred metallic density modulators include, among others, tungsten, tungsten carbide, aluminum, titanium, iron, lead, silicon oxide, and aluminum oxide. The density modulator is dispersed in the polyolefin resin matrix by stirring or mixing. The density, wear resistance and/or "feel" of a metal-filled poly-DCPD composite may be varied in a controllable manner. In particular, poly-DCPD compositions containing aluminum metal powder have a soft surface "feel", while poly-DCPD compositions containing aluminum oxide have a rough surface and are extremely wear-resistant. In the case of metal-filled poly-DCPD composite resins, articles or parts made therefrom may be produced to be isotropic, where the metallic density modulator is dispersed evenly throughout the article or part, or anisotropic, where the metallic density modulator is dispersed unevenly (either through the use of layers or a density gradient).

The amount of metallic density modulator included in the polyolefin compositions of the present invention is preferably about 1-5400 parts per hundred parts resin (phr), by weight. More preferably, the amount of metallic density modulator is about 200-2000 phr and, most preferably, is about 300-1000 phr.

In the case of microparticulate density modulators, the poly-DCPD resin compositions of the present invention have numerous advantages over traditional thermoset polymers (e.g., epoxies, vinyl esters, unsaturated polyesters, urethanes, and silicones) in the fabrication of low- to medium-density syntacetic foams. Specifically, these poly-DCPD resins combine low viscosity (<20 centipoise), long gelling times (>20 minutes), high inherent toughness, and high tensile strength. The low density and viscosity of the poly-DCPD resins of the present invention permit better wetout and packing of the microspheres, resulting in improved physical properties and, simultaneously, decreased densities (preferably, about 5%-30% decrease), compared to current state-of-the-art conventional resin systems. Preferred microparticulate density modulators include, but are not limited to, glass, thermoplastic (either expandable or pre-expanded), thermoset, and/or ceramic/silicate microspheres.

The amount of microparticulate density modulator included in the polyolefin compositions of the present invention is preferably about 1-100 phr by weight. More preferably, the amount of microparticulate density modulator is about 10-60 phr and, most preferably, is about 20-50 phr.

Preferably, in the case of poly-DCPD, the compositions of the present invention possess the following properties: tensile strength of at least about 9000 psi; elongation of at least about 4.5%; tensile modulus of at least about 350,000 psi; flexural strength of at least about 14,000 psi; and flexural modulus of at least about 30,000 psi. These values are typically 25-30% greater than those of commercially available poly-DCPD materials, such as Meton® or Telene®.

The most preferred olefin monomer for use in the present invention is dicyclopentadiene (DCPD). Various DCPD suppliers and purities may be used, such as Lyondell 108 (94.6% purity), Velsicol UHP (99+% purity), B.F. Goodrich Ultrene® (97% and 99% purities), and Hitachi (99+% purity). DCPD sources of lower purities may also be used. Other suitable olefin monomers include cyclooctadiene (COD, DuPont), cyclooctene (COE, Alfa Aesar), cyclohexenylnorbornene (Shell), norbornene, di(methylcyclopentadiene) (Aldrich), and norbornadiene (Elf Atochem).

The UV and oxidative resistance of the polyolefin compositions of the present invention may be enhanced by the addition of various antioxidants. Preferably, one or more antioxidants are included in the polyolefin resin composition at a level of about 0.1-15 phr. More preferably, the antioxidant(s) are present at a level of about 1-10 phr and, most preferably, 3-8 phr. Exemplary antioxidants include, for example, 4,4'-methylenebis(2,6-di-tertiary-butylphenol) (Ethanox 702®; Albemarle Corporation), 1,3,5-trimethyl-2,4,6-tris(3,5-di-tert-butyl-4-hydroxybenzyl) benzene (Ethanox 330®; Albemarle Corporation), octadecyl-3-(3',5'-di-tert-butyl-4'-hydroxyphenyl) propionate (Irganox 1076®; Ciba-Geigy), as well as Irganox 1135® (Ciba-Geigy), and the Tinuvin® (Ciba-Geigy) series of UV stabilizers. Antiozonants, such as Flexzone® (Uniroyal) may also be added.

In addition, a suitable inhibitor such as, for example, triphenylphosphine (TPP), tricyclopentylphosphine, tricyclohexylphosphine, triisopropylphosphine, pyridine, or other Lewis base, may be added to the olefin monomer. In the case of TPP inhibitor, it is preferably included in an amount of about 10-200 mg: per 64 g olefin monomer. More preferably, the amount of TPP is about 30-100 mg per 64 g olefin monomer and, most preferably, is about 50-80 mg per 64 g olefin monomer. In the case of other inhibitors, such as alkylphosphines and pyridine, the amount of inhibitor is preferably about 0.1-50 mg per 64 g olefin monomer, more preferably about 1-40 mg:64 g olefin monomer, and most preferably is about 1-30 mg per 64 g olefin monomer.

Also, various pigments or dyes may be included in the polyolefin resin compositions of the present invention for applications where color is desired. Preferred pigments include Ferro® and Dayglo® products, in an amount of about 0.05-0.5 parts per hundred of polyolefin resin. A particularly preferred class of dyes are photochromic dyes.

The polyolefin resins of the present invention are amenable to the manufacture of composites and are tolerant of additives, fillers and fibers including, but not limited to, carbon, glass, fiberglass and aramid (e.g., Kevlar® and Twaron®) and other polymer fibers (e.g., Spectra®).

The polyolefin compositions, and parts or articles of manufacture prepared therefrom, may be processed in a variety of ways including, for example, Reaction Injection Molding (RIM), Resin Transfer Molding (RTM) and vacuum-assisted variants such as SCRIMP (Seemann Composite Resin Infusion Molding Process), open casting, rotational molding, centrifugal casting, filament winding, and mechanical machining. These processing methods are well known in the art. Various molding and processing techniques are described, for example, in PCT Publication WO 97/20865, the disclosure of which is incorporated herein by reference.

In mold casting processes, the mold may be constructed of various materials including, for example, aluminum, Teflon®, Delrin®, high- and low-density polyethylenes (HDPE and LDPE, respectively), silicone, epoxy, aluminum-filled epoxy, polyurethane and aluminum-filled polyurethane, plaster, polyvinylchloride (PVC), and various alloys of stainless steel.

The mold temperature is preferably about 20-100° C., more preferably about 30-80° C., and most preferably about 40-60° C. The molded polyolefin part or article of the present invention may also be subjected to a post-cure heating step. Preferably, the post-cure involves heating to about 60-160° C. for about 10 minutes-3 hours. More preferably, the post-cure involves heating to about 80-150° C. for about 30 minutes-2 hours and, and most preferably, involves heating to about 100-140° C. for between about 45 and about 90 minutes.

The polyolefin compositions of the present invention are useful in the production of sports, recreational, and marine products and equipment which may provide performance advantages over other materials already in use. Examples of such products and applications include, but are not limited to, the following: golf tees, clubs (including weighted club heads), shafts, gradient shafts (where the formulation varies along the length of the club shaft), balls, and carts; basketball backboards; tennis rackets, squash rackets, racquetball rackets, and badminton racquets; snow boards, surfboards, boogie boards, skis, backboards, sleds, toboggans, snow shoes; baseball bats, bat coatings and end-caps, balls, and helmets; football helmets; hockey helmets, sticks, pads, and pucks; roller blade shoes, wheels, pads, and helmets; bicycle parts, frames, helmets, and trispokes; marine applications (e.g., hulls, coatings, oars, propellers, rudders, keels, masts, jet skis, boat fascia, jet skis, covers, kayaks, and canoes); camping equipment (e.g., tent stakes and supports, tubs, matches, coolers, wedges for splitting wood, axes, hatchets, handles, shovels, and picks); pool cues, pool tables, and pool balls; diving boards, pool liners, lake liners, ladders, steps, floating lounge chairs and tables, pool cleaning equipment, and lounge chairs; motorcycles, motorcycle parts, helmets, and wind screens; archery bows and arrows; guns, rifle cases, butts, bullets, shotgun pellets, decoys, ammunition and shell cases; martial arts protective padding and weapons; soccer goal posts and pads; auto racing helmets, car parts, and bodies; polo mallets, croquet mallets and balls, and cricket bats; toys, puzzles, models, games, and novelty items including model, miniature, or toy trains, airplanes, helicopters, cars, motorcycles, rockets, spacecraft, and other model or toy vehicles, powered or unpowered; dolls and action figures and accessories therefor, recreational architectural models, two- and three-dimensional puzzles, game pieces, boards, dice, poker chips, and other game accessories and components; bowling balls and pins; tether ball pole, net supports in volleyball; All Terrain Vehicles (ATV); lawn darts, quoits, and horseshoes; and knives, knife handles, and swords.

The polyolefin compositions of the present invention are useful in the production of foams of various densities which are useful in numerous applications where properties such as weight, buoyancy, acoustic impedance, anticorrosion, antifouling, and low moisture absorption are considerations. Of particular note, the polyolefin compositions of the present invention are particularly useful in the production of golf club driver heads, exhibiting the performance of titanium drivers with the sound and "feel" of wood drivers.

Other commercial applications for the present invention include, for example, ballistics and blast containment, industrial coatings, architectural coatings, and other scratch resistant coatings, adhesives, inks, paints, and gel coats. Additionally, the compositions of the present invention are useful in polymer mixtures, interpenetrating polymer networks, fabrics, composites (fiber- or particle-reinforced), blends, alloys, elastomers, ionomers, and dendrimers, among others.

The compositions of the present invention are also useful in the manufacture of wafer carriers and other semiconductor handling equipment, as well as parts for the construction of semiconductor fabrication facilities, such as walls, fascia, sinks, and decking. Additionally, these materials are useful as low k dielectrics and components for chemical/mechanical planarization (CMP).

In the case of polyolefin compositions or parts comprising metallic density modulators (i.e., metal composites), the present invention permits the advantageous control of balance, weight and density localization. These capabilities provide for the enhancement of the performance of, for example, golf club heads and putters and composite tooling, through selective addition and location of metallic density modulators.

In the case of polyolefin compositions or parts comprising microparticulate density modulators (i.e., syntacetic foam), advantages of the compositions of the present invention are evidenced in the lightweight support and flexion enhancement of sports equipment such as archery bows, bats, sticks, and shafts. Other preferred uses for the syntacetic foams of the present invention include hulls and other components of boats and submersibles, core materials for skis and surf-, snow-, and skateboards, and lightweight reinforcement of safety equipment such as pads and helmets.

EXAMPLES

Example 1

A 500 mL round bottom (RB) flask was charged with 250 g DCPD (Velsicol UHP), 15 g Ethanox® 702 (Albemarle), and a magnetic stir-bar. The mixture was stirred and heated to 35° C. to yield a clear light yellow solution. A separate 100 mL RB flask was charged with 50 g DCPD (Velsicol UHP), 280 mg triphenylphosphine (TPP) inhibitor, and a magnetic stir-bar. The mixture was stirred and heated to 35° C. to yield a clear colorless solution. To this latter solution was added (with stirring) 300 mg bis(tricyclohexylphosphine) benzylidene ruthenium dichloride metathesis catalyst (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the golf club head was removed from the mold. The golf club head was then subjected to a post-cure at 130° C. for a period of 1 hour and cooled to ambient temperature before a golf club shaft was attached thereto.

Example 2

A 500 mL RB flask was charged with 250 g DCPD (Velsicol UHP), 15 g Ethanox® 702 (Albemarle), and a magnetic stir-bar. The mixture was stirred and heated to 35° C. to yield a clear light yellow solution. A separate 100 mL RB flask was charged with 50 g DCPD (Velsicol UHP), 400 mg triphenylphosphine (TPP), and a magnetic stir-bar. The mixture was stirred and heated to 35° C. to yield a clear colorless solution. To this latter solution was added (with stirring) 350 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the golf club head was removed from the mold. The golf club head was then subjected to a post-cure at 130° C. for a period of 1 hour and cooled to ambient temperature before a golf club shaft was attached thereto. This formulation greatly decreased the shrinkage in the face of the club head, probably as a result, in part, of the increased amounts of TPP inhibitor and/or catalyst.

Example 3

A 500 mL RB flask was charged with 300 g DCPD (Velsicol UHP), 35 g Irganox® 1076 (Ciba), and a magnetic stir-bar. The mixture was stirred and heated to 30° C. to yield a clear light yellow solution. A separate 100 mL RB flask was charged with 50 g DCPD (Velsicol UHP), 450 mg triphenylphosphine (TPP), and a magnetic stir-bar. The mixture was stirred and heated to 35° C. to yield a clear colorless solution. To this latter solution was added (with stirring) 400 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 ml RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded golf club head was removed from the mold. The golf club head was then subjected to a post-cure at 130° C. for a period of 1 hour and cooled to ambient temperature before a golf club shaft was attached thereto. This club head exhibited a slightly softer feel than samples prepared in Examples 1 and 2, probably due, in part, to the greater amount of Irganox® 1076, which has a plasticizing effect on the formulation.

Example 4

A 1000 mL RB flask was charged with 400 g DCPD (Velsicol UHP), 25 g Ethanox® 702 (Albemarle), 50 g polybutadiene (Aldrich, 38,369-4), and a magnetic stir-bar. The mixture was stirred and heated to 35° C. to yield a clear light yellow solution. A separate 100 mL RB flask was charged with 50 g DCPD (Velsicol UHP), 750 mg triphenylphosphine, and a magnetic stir-bar. The mixture was stirred and heated to 35° C. to yield a clear colorless solution. To this latter solution was added (with stirring) 600 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded golf club head was removed from the mold. The golf club head was then subjected to a post-cure at 130° for a period of 1 hour and cooled to ambient temperature before a golf club shaft was attached thereto. This club head exhibited a softer feel than Example 3 because of the addition of polybutadiene. Additionally, when this formulation was poured into small (<50 mL) sample containers, gelation was accompanied by phase separation. Interestingly, upon post-cure (130° C. for 1 hour), the golf club head was homogenous in appearance, despite the inclusion of polybutadiene in the formulation.

Example 5

A 1000 mL RB flask was charged with 400 g DCPD (Ultrene®97 from B.F. Goodrich), 25 g Ethanox®702 (Albemarle), 50 g polybutadiene (Aldrich, 38,369-4) and a magnetic stir-bar. The mixture was stirred and heated to 35° C. to yield a clear light yellow solution. A separate 100 mL RB flask was charged with 50 g DCPD (Ultrene®97 from B.F. Goodrich), 750 mg triphenylphosphine, and a magnetic stir-bar. The mixture was stirred and heated to 35° C. to yield a clear colorless solution. To this latter solution was added (with stirring) 600 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded golf club head was removed from the mold. The golf club head was then subjected to a post-cure at 130° C. for a period of 1 hour and cooled to ambient temperature before a golf club shaft was attached thereto. This club head exhibited a softer feel (similar to the sample from Example 4) due to the addition of polybutadiene. Additionally, when this formulation was then poured into small (<50 ml) sample containers, gelation was accompanied by phase separation. Interestingly, upon post-cure (130° C. for 1 hour), the golf club head was homogenous in appearance, despite the inclusion of polybutadiene in the formulation.

Example 6

A 1000 mL RB flask was charged with 400 g DCPD (Ultrene®99 from B.F. Goodrich), 25 g Ethanox®702 (Albemarle), 50 g polybutadiene (Aldrich, 38,369-4) and a magnetic stir-bar. The mixture was stirred and heated to 35° C. to yield a clear light yellow solution. A separate 100 mL RB flask was charged with 50 g DCPD (Ultrene®99 from B.F. Goodrich), 750 mg triphenylphosphine, and a magnetic stir-bar. The mixture was stirred and heated to 35° C. to yield a clear colorless solution. To this latter solution was added (with stirring) 600 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded golf club head was removed from the mold. The golf club head was then subjected to a post-cure at 130° C. for a period of 1 hour and cooled to ambient temperature before a golf club shaft was attached thereto. This club head exhibited a softer feel (similar to the sample from Example 4) because of the addition of polybutadiene. Additionally, when this formulation was then poured into small (<50 ml) sample containers, gelation was accompanied by phase separation. Interestingly, upon post-cure (130° C. for 1 hour), the golf club head was homogenous in appearance, despite the inclusion of polybutadiene in the formulation.

Example 7

A 1000 mL RB flask was charged with 400 g DCPD (Lyondell 108, filtered through activated alumina), 25 g Ethanox®702 (Albemarle), 50 g polybutadiene (Aldrich, 38,369-4) and a magnetic stir-bar. The mixture was stirred and heated to 35° C. to yield a clear light yellow solution. A separate 100 mL RB flask was charged with 50 g DCPD (Lyondell 108, filtered through activated alumina), 750 mg triphenylphosphine, and a magnetic stir-bar. The mixture was stirred and heated to 35° C. to yield a clear colorless solution. To this latter solution was added (with stirring) 600 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded golf club head was removed from the mold. The golf club head was then subjected to a post-cure at 130° C. for a period of 1 hour and cooled to ambient temperature before a golf club shaft was attached thereto. This club head exhibited a softer feel (similar to the sample from Example 4) because of the addition of polybutadiene. Additionally, when this formulation was then poured into small (<50 ml) sample containers, gelation was accompanied by phase separation. Interestingly, upon post-cure (130° C. for 1 hour), the golf club head was homogenous in appearance, despite the inclusion of polybutadiene in the formulation.

Example 8

A 1000 mL RB flask was charged with 400 g DCPD (Hitachi 99), 25 g Ethanox®702 (Albemarle), 50 g polybutadiene (Aldrich, 38,369-4) and a magnetic stir-bar. The mixture was stirred and heated to 35° C. to yield a clear light yellow solution. A separate 100 mL RB flask was charged with 50 g DCPD (Hitachi high purity), 750 mg triphenylphosphine, and a magnetic stir-bar. The mixture was stirred and heated to 35° C. to yield a clear colorless solution. To this latter solution was added (with stirring) 600 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded golf club head was removed from the mold. The golf club head was then subjected to a post-cure at 130° C. for a period of 1 hour and cooled to ambient temperature before a golf club shaft was attached thereto. This club head exhibited a softer feel (similar to the sample from Example 4) because of the addition of polybutadiene. Additionally, when this formulation was then poured into small (<50 ml) sample containers, gelation was accompanied by phase separation. Interestingly, upon post-cure (130° C. for 1 hour), the golf club head was homogenous in appearance, despite the inclusion of polybutadiene in the formulation.

Example 9

A 1000 mL RB flask was charged with 250 g DCPD (Velsicol UHP), 15 g Ethanox®702 (Albemarle), and a magnetic stir-bar. The mixture was stirred and heated to 35° C. to yield a clear light yellow solution. A separate 100 mL RB flask was charged with 50 g DCPD (Velsicol UHP), 280 mg triphenylphosphine, and a magnetic stir-bar. The mixture was stirred and heated to 35° C. to yield a clear colorless solution. To this latter solution was added (with stirring) 300 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded golf club head was removed from the mold. The golf club head was then subjected to a post-cure at 130° C. for a period of 1 hour and cooled to ambient temperature before a golf club shaft was attached thereto.

Example 10

A 1000 mL RB flask was charged with 250 g DCPD (Velsicol UHP), 15 g Ethanox®702 (Albemarle), 1.5 g Tinuvin®213 (Ciba) and a magnetic stir-bar. The mixture was stirred and heated to 35° C. to yield a clear light yellow solution. A separate 100 mL RB flask was charged with 50 g DCPD (Velsicol UHP), 280 mg triphenylphosphine, and a magnetic stir-bar. The mixture was stirred and heated to 35° C. to yield a clear colorless solution. To this latter solution was added (with stirring) 300 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded golf club head was removed from the mold. The golf club head was then subjected to a post-cure at 130° C. for a period of 1 hour and cooled to ambient temperature before a golf club shaft was attached thereto.

Example 11

A 1000 mL RB flask was charged with 250 g DCPD (Velsicol UHP), 15 g Ethanox®702 (Albemarle), 0.3 g Ferro Corp. red pigment (34-51084) and a magnetic stir-bar. The mixture was stirred and heated to 35° C. to yield a clear light yellow solution. A separate 100 mL RB flask was charged with 50 g DCPD (Velsicol UHP), 280 mg triphenylphosphine, and a magnetic stir-bar. The mixture was stirred and heated to 35° C. to yield a clear colorless solution. To this latter solution was added (with stirring) 300 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded red golf club head was removed from the mold. The golf club head was then subjected to a post-cure at 130° C. for a period of 1 hour and cooled to ambient temperature before a golf club shaft was attached thereto.

Example 12

A 1000 mL RB flask was charged with 250 g DCPD (Velsicol UHP), 15 g Ethanox®702 (Albemarle), 3 g dodecamethylpentasiloxane (Rhone-Poulenc) and a magnetic stir-bar. The mixture was stirred and heated to 35° C. to yield a clear light yellow solution. A separate 100 mL RB flask was charged with 50 g DCPD (Velsicol UHP), 280 mg triphenylphosphine, and a magnetic stir-bar. The mixture was stirred and heated to 35° C. to yield a clear colorless solution. To this latter solution was added (with stirring) 300 mg bis(tricyclohexylphosphine) benzylidene ruthenium dichloride (sieved through a 45 mesh size sieve). After approximately 5 minutes, the mixture evolved a clear dark amber/purple color. This solution was then added to the solution in the 500 mL RB flask with continued stirring. After approximately 3 minutes, the mixture turned into a clear amber solution. The resin solution was then poured into a mold that had been previously formed into the shape of a golf club head. The mold had been heated to approximately 40° C. prior to the addition of the resin. Within 30 minutes, the resin appeared to be gelled and within 1 hour the molded golf club head was removed from the mold. The golf club head was then subjected to a post-cure at 130° C. for a period of 1 hour and cooled to ambient temperature before a golf club shaft was attached thereto.

Example 13

A 500 mL RB flask was charged with 250 g DCPD monomer (B.F. Goodrich Ultrene® 99), 9 g Ethanox® 702 antioxidant (Albemarle Corporation), and a magnetic stir bar. The mixture was stirred and heated to 35° C. to yield a clear light yellow solution. A separate 100 mL RB flask was charged with 50 g DCPD monomer (B.F. Goodrich), 0.3 g triphenylphosphine (TPP) inhibitor, and a magnetic stir bar. The mixture was stirred and heated to 35° C. to yield a clear colorless solution. To this latter solution was added (with stirring) 0.37 g bis(tricyclohexylphosphine) benzylidene ruthenium dichloride metathesis catalyst (sieved through a 45 mesh size sieve). After approximately 1 minute, the mixture evolved a clear dark amber/purple color. This solution was then added to the solution in the 500 mL RB flask with continued stirring. After approximately 2 minutes, the mixture turned into a clear amber solution. The resin solution was then poured into a mold that had been previously formed into the shape of a golf club head. The mold had been heated to approximately 50° C. prior to the addition of the resin. Within 30 minutes, the resin appeared to be gelled and within 1 hour the molded golf club head was removed from the mold and allowed to cool for 12 hours. The golf club head was then subjected to a post-cure at 130° C. for a period of 1 hour and cooled to ambient temperature before a golf club shaft was attached thereto.

Example 14

A 500 mL RB flask was charged with 235 g DCPD monomer (B.F. Goodrich), 9 g Ethanox® 702 (Albemarle Corp.), 15 g norbornene (Aldrich), 5 g dioctyl phthalate (Aldrich), and a magnetic stir bar. The mixture was stirred and heated to 45° C. to yield a clear light yellow solution. A separate 100 mL RB flask was charged with 50 g DCPD monomer (B.F. Goodrich), 0.3 g triphenylphosphine (TPP), and a magnetic stir bar. This latter mixture was stirred and heated to 35° C. to yield a clear colorless solution. To this solution, 0.37 g bis(tricyclohexylphosphine) benzylidene ruthenium dichloride metathesis catalyst (sieved through a 45 mesh size sieve) was added with stirring. After approximately 1 minute, the mixture became a clear dark amber/purple color. This solution was then added to the solution in the 500 mL RB flask with continued stirring. After approximately 2 minutes, the mixture turned into a clear amber solution. The solution was then poured into a mold that had been previously formed into the shape of a golf ball. The mold had been heated to approximately 50° C. prior to the addition of the resin. Within 30 minutes, the resin appeared to be gelled and within 1 hour the molded golf ball was removed from the mold and allowed to cool for 12 hours. The golf ball was then subjected to a post-cure at 130° C. for a period of 1 hour and cooled to ambient temperature. This formulation was slightly softer than that of Example 13, probably due, in part, to the inclusion of dioctyl phthalate.

Example 15

A 500 mL RB flask was charged with 235 g DCPD monomer (B.F. Goodrich), 9 g Ethanox® 702 (Albemarle Corp.), 15 g polybutadiene (Aldrich; 3000 MW), and a magnetic stir bar. The mixture was stirred and heated to 35° C. to yield a clear light yellow solution. A separate 100 mL RB flask was charged with 50 g DCPD monomer (B.F. Goodrich), 0.3 g triphenylphosphine, and a magnetic stir bar. The latter mixture was stirred and heated to 35° C. to yield a clear colorless solution. To this solution, 0.37 g bis (tricyclohexylphosphine) benzylidene ruthenium dichloride metathesis catalyst (sieved through a 45 mesh size sieve) was added with stirring. After approximately 1 minute, the mixture evolved a clear dark amber/purple color. This solution was then added to the solution in the 500 mL RB flask with continued stirring. After approximately 2 minutes, the mixture turned into a clear amber solution. The clear amber resin solution was then poured into a mold that had been previously formed into the shape of a golf ball. The mold had been heated to approximately 50° C. prior to the addition of the resin. Within 30 minutes, the resin appeared to be gelled and within 1 hour the molded golf ball was removed from the mold and allowed to cool for 12 hours. The golf ball was then subjected to a post-cure at 130° C. for a period of 1 hour and cooled to ambient temperature. This formulation was similar in softness to that of Example 14 above, with the addition of polybutadiene instead of dioctyl phthalate.

Example 16

A 500 mL RB flask was charged with 220 g DCPD monomer (B.F. Goodrich), 9 g Ethanox® 702 (Albemarle Corp.), 30 g polybutadiene (Aldrich; 5000 MW), 0.6 g black pigment (Ferro) and a magnetic stir bar. The mixture was stirred and heated to 35° C. to yield a black solution. A separate 100 mL RB flask was charged with 50 g DCPD monomer (B.F. Goodrich), 0.3 g triphenylphosphine, and a magnetic stir bar. The latter mixture was stirred and heated to 35° C. to yield a clear colorless solution. To this solution, 0.37 g bis(tricyclohexylphosphine) benzylidene ruthenium dichloride metathesis catalyst (sieved through a 45 mesh size sieve) was added with stirring. After approximately 1 minute, the mixture had a clear dark amber/purple color.

This solution was then added to the solution in the 500 mL RB flask with continued stirring. After approximately 2 minutes, the mixture was a dark green/black solution. The resin solution was then poured into a mold that had been previously formed into the shape of a golf ball. The mold had been heated to approximately 50° C. prior to the addition of the resin. Within 30 minutes, the resin appeared to be gelled and within 1 hour the molded golf ball was removed from the mold and allowed to cool for 12 hours. The golf ball was then subjected to a post-cure at 130° C. for a period of 1 hour and cooled to ambient temperature. This formulation was similar in softness to that in Example 14, in addition to being opaque black rather than clear amber.

Example 17

A 500 mL RB flask was charged with 150 g DCPD monomer (B.F. Goodrich), 9 g Ethanox® 702 (Albemarle Corp.), 135 g polybutadiene (Aldrich; 3000 MW), 15 g 1,5-cyclooctadiene (Aldrich), 6 g t-butyl peroxide (Aldrich), and a magnetic stir bar. The mixture was stirred and heated to 35° C. to yield a clear light yellow solution. A separate 100 mL RB flask was charged with 50 g DCPD monomer (B.F. Goodrich), 0.3 g triphenylphosphine (0.3 g), and a magnetic stir bar. This latter mixture was stirred and heated to 35° C. to yield a clear colorless solution. To this solution, 0.6 g bis(tricyclohexylphosphine) benzylidene ruthenium dichloride metathesis catalyst (sieved through a 45 mesh size sieve) was added with stirring. After approximately 1 minute, the mixture had a clear dark amber/purple color. This solution was then added to the solution in the 500 mL RB flask with continued stirring. After approximately 2 minutes, the mixture turned into a clear amber solution. The resin solution was then poured into a mold that had been previously formed into the shape of a golf ball. The mold had been heated to approximately 50° C. prior to the addition of the resin. Within 30 minutes, the resin appeared to be gelled and within 2 hours the molded golf ball was removed from the mold and allowed to cool for 12 hours. The golf ball was then subjected to a post-cure at 130° C. for a period of 1 hour and cooled to ambient temperature. This formulation was much softer than that of Example 14, probably due, in part, to the inclusion of a greater amount of polybutadiene than previous Examples and/or the inclusion of the co-monomer cyclooctadiene. However, this formulation had a slight odor.

Example 18

A 500 mL RB flask was charged with 220 g DCPD monomer (B.F. Goodrich), 9 g Ethanox® 702 (Albemarle Corp.), 15 g polyisoprene (Aldrich; 38,000 MW), 15 g cis-cyclooctene (Avocado), and a magnetic stir bar. The mixture was stirred and heated to 35° C. to yield a yellow solution. A separate 100 mL RB flask was charged with 50 g DCPD monomer (B.F. Goodrich), 0.3 g triphenylphosphine, and a magnetic stir bar. This latter mixture was stirred and heated to 35° C. to yield a clear colorless solution. To this solution, 0.37 g bis(tricyclohexylphosphine) benzylidene ruthenium dichloride metathesis catalyst (sieved through a 45 mesh size sieve) was added with stirring. After approximately 1 minute, the mixture had a clear dark amber/purple color. This solution was then added to the solution in the 500 mL RB flask with continued stirring. After approximately 2 minutes, the mixture was an amber solution. The resin solution was then poured into a mold that had been previously formed into the shape of a golf ball. The mold had been heated to approximately 50° C. prior to the addition of the resin. Within 30 minutes, the resin appeared to be gelled and within 1 hour the molded golf ball was removed from the mold and allowed to cool for 12 hours. The golf ball was then subjected to a post-cure at 130° C. for a period of 1 hour and cooled to ambient temperature. This formulation was similar in softness to that of Example 14, probably due to the inclusion of polyisoprene and/or the co-monomer cis-cyclooctene. This formulation was yellow in appearance.

Example 19

A 250 mL RB flask was charged with 80 g DCPD monomer (B.F. Goodrich), 3 g Ethanox® 702 (Albemarle Corp.), 3 g poly(dimethylsiloxane) (Shin Etsu DMF-50), and a magnetic stir bar. The mixture was stirred and heated to 35° C. to yield a clear light yellow solution. A separate 50 mL RB flask was charged with 20 g DCPD monomer (B.F. Goodrich), 0.1 g triphenylphosphine, and a magnetic stir bar. This latter mixture was stirred and heated to 35° C. to yield a clear colorless solution. To this solution, 0.14 g bis (tricyclopentylphosphine) dimethylvinylmethylidene ruthenium dichloride metathesis catalyst (sieved through a 45 mesh size sieve) was added with stirring. After approximately 1 minute, the mixture had a clear dark amber/purple color. This solution was then added to the solution in the 250 mL RB flask with continued stirring. After approximately 2 minutes, the mixture turned into a clear amber solution. The resin solution was then poured into a mold with cavities formed into shapes appropriate for both DTUL and Izod measurements. The mold had been heated to approximately 40° C. prior to the addition of the resin. Within 30 minutes, the resin appeared to be gelled and within 1 hour the mold was removed from the oven and allowed to cool for 12 hours. The parts were then subjected to an in-mold post-cure at 130° C. for a period of 1 hour and cooled to ambient temperature. After appropriate preparation and conditioning, these parts displayed a notched Izod strength of 4.24 ft.-lb./in. and a DTUL (264 psi) of 136° C. The toughness of these parts was probably due, in part, to the inclusion of poly (dimethylsiloxane) in the formulation.

Example 20

A resin was prepared and cast as in Example 19, but using 3 g poly(diphenylsiloxane) (Shin Etsu F-5W-O-100) in place of the poly(dimethylsiloxane). After appropriate preparation and conditioning, these parts displayed a notched Izod strength of 3.24 ft.-lb./in and a DTUL (264 psi) of 139° C.

Example 21

Using the same general procedure set forth in Example 13 above, two batches of resin were prepared containing:
A) 67 g DCPD monomer (B.F. Goodrich), 28 g polybutadiene (Aldrich; 3000 MW), 2.8 g cis-cyclooctene (Avocado), 1 g t-butyl peroxide (Aldrich), 0.33 g black pigment (Ferro), 0.1 g triphenylphosphine, and 0.124 g bis(tricyclohexylphosphine) benzylidene ruthenium dichloride metathesis catalyst (sieved through a 45 mesh size sieve); and
B) 50 g DCPD monomer (B.F. Goodrich), 1.5 g Ethanox® 702 (Albemarle Corp.), 0.33 g black pigment (Ferro), 300 g tungsten powder (Teledyne Advanced Materials; 150 mesh), 0.05 g triphenylphosphine, and 0.124 g bis(tricyclohexylphosphine) benzylidene ruthenium dichloride metathesis catalyst (sieved through a 45 mesh size sieve).

A mold that had been previously formed into the shape of a golf putter head was heated to approximately 50° C. The black liquid resin A was then poured into the mold, filling it to within approximately one inch of the top (face of the putter head). Within 30 minutes, resin A appeared to be gelled and within 1 hour resin B, a viscous black liquid, was then poured into the mold on top of gelled resin A, filling the mold completely. After 1 hour, the golf putter head was demolded and allowed to cool for 12 hours. The golf putter head was then subjected to a post-cure at 130° C. for a period of 1 hour and cooled to ambient temperature. The resulting face-weighted putter head massed 350 g and displayed a surface hardness of D50 (Shore).

Example 22

Resins A and B were prepared as in Example 21 above. In this case, however, the golf putter mold was completely filled with resin A and, after gelling 1 h in the mold, the putter head was demolded and allowed to cool for 12 hours. A portion of each of the heel and toe areas of the putter was removed, and the remainder of the part reinserted into the mold, which was then preheated to approximately 50° C. Resin B was then poured into the mold, filling in the voids created by the removal of the heel and toe sections of the putter head. After 1 hour, the part was demolded and allowed to cool for 12 hours. The putter head was then subjected to a post-cure at 130° C. for a period of 1 hour and cooled to ambient temperature. The resulting heel/toe perimeter-weighted putter head weighed 300 g and displayed a surface hardness of D50 (Shore).

Example 23

A putter head was prepared as described in Example 22 above, but not subjected to post-cure. After demolding, approximately 1" of the non-tungsten-filled plastic was removed from the face of the putter. The putter head was reinserted into the mold and the mold was then heated to approximately 50° C. In a 100 mL RB flask a resin was prepared containing 50 g DCPD monomer (B.F. Goodrich), 1.5 g Ethanox® 702 (Albemarle Corp.), 10 g aluminum powder (Alfa Aesar; 3 micron), 0.05 g triphenylphosphine, and 0.062 g bis(tricyclohexylphosphine) benzylidene ruthenium dichloride metathesis catalyst (sieved through a 45 mesh size sieve). The fresh resin was then poured into the mold, thereby filling in the void created by the prior removal of the non-tungsten-filled plastic material from the putter face. Within 30 minutes, the aluminum-filled resin appeared to be gelled and within 1 hour the molded putter head was removed from the mold and allowed to cool for 12 hours. The putter head was then subjected to a post-cure at 130° C. for a period of 1 hour and cooled to ambient temperature before a shaft was attached thereto. The overall mass and weighting characteristics of the resulting putter were similar to those of the putter in Example 21, but with a significantly softer and more solid sound and feel when used to strike (putt) a golf ball.

Example 24

A 5 L RB flask equipped with a magnetic stir bar and a gas inlet adapter was charged with 2250 g DCPD monomer (B.F. Goodrich), 67.5 g Ethanox® 702 (Albemarle Corp.), 4.5 g triphenylphosphine, and 2.497 g bis(tricyclopentylphosphine) dimethylvinylmethylidene ruthenium dichloride metathesis catalyst (sieved through a 45 mesh size sieve). Glass microspheres (3M; K25 grade, 720 g) that had been dried at 130° C. for 6 hours were gradually added to the resin in the 5 L RB flask with stirring, resulting in a pale yellow mixture with the viscosity of lightly whipped cream. This resin mixture was degassed in vacuo to remove any trapped air bubbles (~20 min.) and then poured into a rectangular mold that had been preheated to 40° C. The part was cured in the mold at 40° C. for 12 hours, then post-cured in the mold for 40 min. at 130° C., then for an additional 20 min. at 150° C. After cooling to ambient temperature, the demolded panel was found to be essentially void-free and had a density of about 34 lb./ft$^3$. After appropriate machining and conditioning, this material displayed a DTUL (264 psi) of 130° C., Izod strengths of 0.965 ft.-lb./in (unnotched) and 0.329 ft.-lb./in (notched), a compressive strength of 10,000 psi and a compressive modulus of 250,000. These characteristics were probably due, in part, to the inclusion of glass microspheres in the formulation.

Example 25

In the same manner as Example 24 was prepared a resin comprising: 200 g DCPD monomer (B.F. Goodrich), 6 g Ethanox® 702 (Albemarle Corp.), 6 g poly(dimethylsiloxane) (Shin Etsu DMF-50), 0.4 g triphenylphosphine, and 0.22 g bis(tricyclopentylphosphine) dimethylvinylmethylidene ruthenium dichloride metathesis catalyst (sieved through a 45 mesh size sieve), and 74 g glass microspheres (3M; K25 grade). The syntacetic foam of this Example displayed an unnotched Izod strength of 2.4 ft.-lb./in., probably as a result, in part, of the inclusion of poly(dimethylsiloxane) in the formulation.

What is claimed is:

1. A composition consisting essentially of:
   a polyolefin prepared by the metathesis of an olefin monomer using a ruthenium or osmium carbene catalyst; and
   one or more toughness and/or hardness modulators, the one or more toughness and/or hardness modulators comprising a silicone.

2. The composition of claim 1, wherein the polyolefin is poly-DCPD.

3. The composition of claim 1, wherein the silicone is polysiloxane.

4. The composition of claim 3, wherein the polysiloxane is a poly(dimethylsiloxane) or a poly(diphenylsiloxane).

5. The composition of claim 2 wherein the one or more toughness modulators is present in an amount between about 0.1% and about 20% by weight of the olefin monomer.

6. The composition of claim 5 wherein the one or more toughness modulators is present in an amount between about 0.5% and about 10% by weight of the olefin monomer.

7. The composition of claim 6 wherein the one or more toughness modulators is present in an amount between about 1% and about 5% by weight of the olefin monomer.

8. A golf club head consisting essentially of:
   a polyolefin prepared by the metathesis of an olefin monomer using a ruthenium or osmium carbene catalyst; and
   one or more toughness and/or hardness modulators comprising a silicone.

9. The golf club head of claim 8 wherein the polyolefin is poly-DCPD.

10. A process for preparing a composition having hardness or toughness properties consisting essentially of contacting a cyclic olefin with a ruthenium or osmium carbene catalyst and one or more hardness and/or toughness modulators, the one or more toughness and/or hardness modulators comprising a silicone.

11. The process of claim 10 wherein the silicone is a polysiloxane.

12. The process of claim 11 wherein the polysiloxane is a poly(dimethylsiloxane) or a poly(diphenylsiloxane).

13. The process of claim 10 wherein the one or more toughness modulators is present in an amount between about 0.1% and about 20% by weight of the cyclic olefin.

14. The process of claim 13 wherein the one or more toughness modulators is present in an amount between about 0.5% and about 10% by weight of the cyclic olefin.

15. The process of claim 14 wherein the one or more toughness modulators is present in an amount between about 1% and about 5% by weight of the cyclic olefin.

16. A composition comprising:
a polyolefin prepared by the metathesis of an olefin monomer using a ruthenium or osmium carbene catalyst; and one or more toughness modulators; wherein the olefin monomer is a dicyclopentadiene and the one or more toughness modulators is poly(dimethylsiloxane) or poly(diphenylsiloxane).

17. The process of claim 10 wherein the cyclic olefin is dicyclopentadiene.

18. The composition of claim 1 wherein the olefin monomer is dicyclopentadiene.

19. A composition comprising:
a polyolefin prepared by the metathesis of an olefin monomer using a ruthenium or osmium carbene catalyst; and
one or more toughness and/or hardness modulators, wherein the one or more toughness modulators comprises a silicone.

20. The composition of claim 19, wherein the silicone is a polysiloxane.

21. The composition of claim 20, wherein the polysiloxane is a poly(dimethylsiloxane) or a poly(diphenylsiloxane).

22. An article of manufacture comprising:
a polyolefin prepared by the metathesis of an olefin monomer using a ruthenium or osmium carbene catalyst; and
one or more toughness and/or hardness modulators comprising a silicone,
wherein the polyolefin is poly-DCPD, and wherein the article is a molded part selected from the group consisting of a golf club head and a golf club shaft.

23. A process for preparing a composition having hardness or toughness properties comprising contacting a cyclic olefin with a ruthenium or osmium carbene catalyst and one or more hardness and/or toughness modulators, wherein the one or more toughness modulators comprises a silicone.

24. The process of claim 23, wherein the silicone is a polysiloxane.

25. The process of claim 24, wherein the polysiloxane is a poly(dimethylsiloxane) or a poly(diphenylsiloxane).

26. A golf club shaft consisting essentially of:
a polyolefin prepared by the metathesis of an olefin monomer using a ruthenium or osmium carbene catalyst; and
one or more toughness and/or hardness modulators.

* * * * *